SAMUEL C. TILLINGHAST.
Improvement in Wheels for Vehicles.
No. 125,420. Patented April 9, 1872.
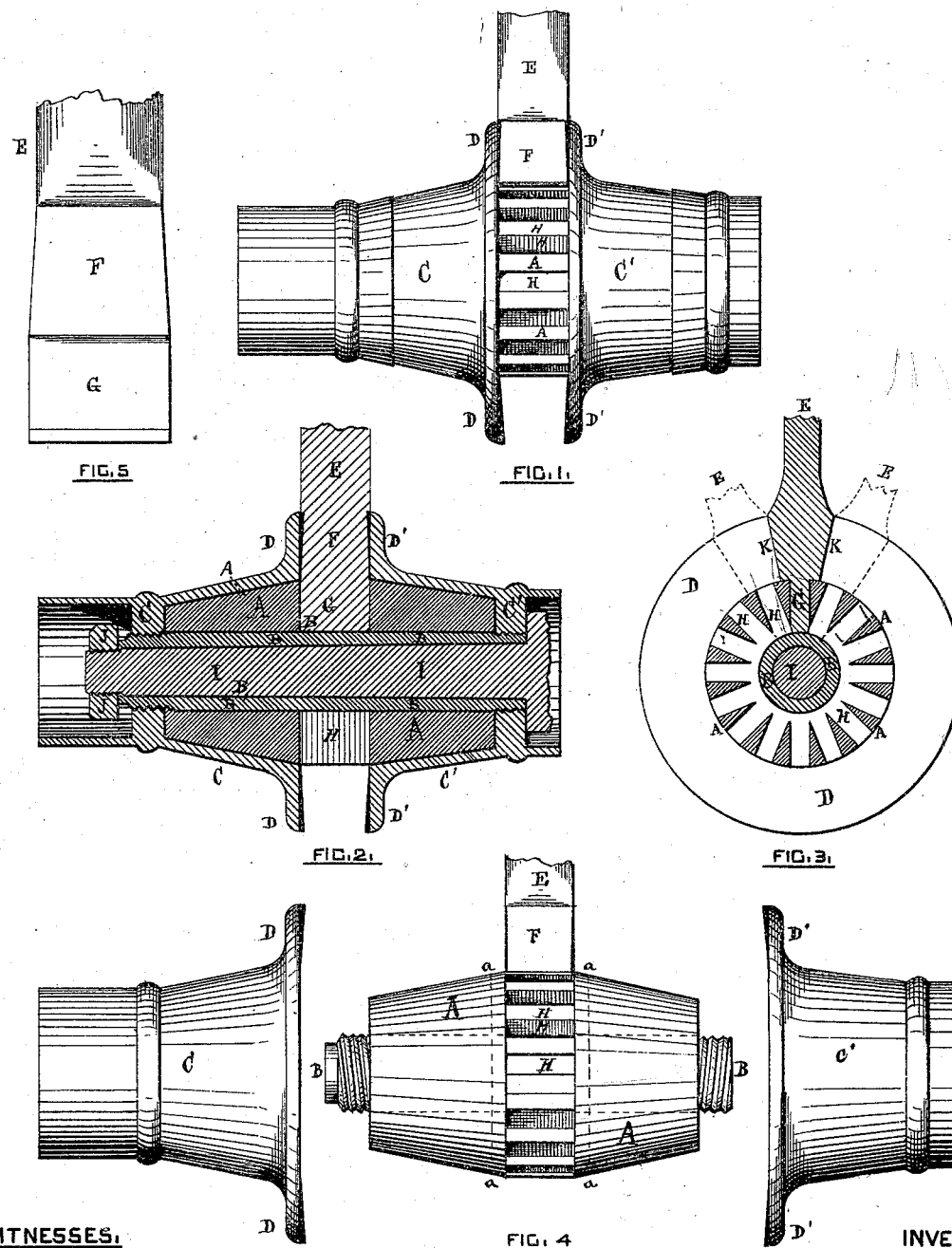

125,420

UNITED STATES PATENT OFFICE.

SAMUEL C. TILLINGHAST, OF CRANSTON, RHODE ISLAND.

IMPROVEMENT IN WHEELS FOR VEHICLES.

Specification forming part of Letters Patent No. 125,420, dated April 9, 1872.

*To all whom it may concern:*

Be it known that I, SAMUEL C. TILLINGHAST, of the town of Cranston, in the county of Providence, in the State of Rhode Island, have invented a new and Improved Hub for Carriage-Wheels, of which the following is a specification:

In the accompanying drawing like letters indicate like parts.

Figure 1 is a perspective view of my invention. Fig. 2 is a longitudinal section of my improved hub. Fig. 3 is a transverse section of my improved hub. Fig. 4 shows the parts of my invention separately. Fig. 5 is an enlarged view at the end of the spoke at and near its connection with the hub.

The parts of my invention are thus described: A is a wooden hub, with mortises H H to receive the spokes. Longitudinally through the hub A is an opening, which incloses loosely the axle-box B. Screw-threads are cut on both ends of the axle-box B, on one end a left-handed screw-thread, on the other end a right-handed screw-thread. (See Fig 4.) Upon these ends of the axle-box B are screwed the hub-bands or cases C and C', which are made of malleable iron or other suitable metal. The hub-bands C and C' are provided with flanges D and D', the edges of which are slightly inclined outwardly. (See Fig. 4.) The spoke E, as shown in Fig. 5, near its end, is formed in a dovetail shape, F, to correspond with the inclining flanges D and D'. As viewed from the front of the wheel, (see Fig. 3) the spoke-end, above the tenon, appears with wedge-like faces K K, corresponding with those of the spokes next contiguous on both sides, and all keying together so as to form a continuous circle. The spoke E terminates in a tenon, G, fitting into its proper mortise in the hub A. The axle I, with its nut J, is precisely similar to those used in the ordinary hubs. The strength of a wheel is principally at the hub. By my invention great strength is obtained at this place by these several devices: First, by the corresponding faces and keying together of the spokes, as shown in Fig. 3, whereby a continous circle is formed and each spoke receives the lateral support of the adjacent spokes. This arrangement affords resistance to all strains and pressure in the line of the spoke inwardly toward the hub. Second, by the clamping of the spokes together, by means of the flanges D D' of the hub-bands C C', whereby all lateral strains and pressure in the direction of the axle are resisted. In the ordinary hub only the tenon is embedded in the hub, and the strength of the spoke is simply that of the tenon alone. But in my improved hub the spoke is secured not only by the mortise, but by the wedge-like faces of adjacent spokes on two sides, and by the flanges D D' on the other two sides, thus making the part of the spoke actually embedded in the hub A and hub-bands C C' nearly twice as long as is embedded in the ordinary hub. Of course the strength of the wheel is greatly increased by this massing of material at and around the hub. By this arrangement it is impossible to twist or "ring out" the spoke from the hub, as frequently occurs in accidents with the common hub. Third, by the dovetailed combination of the flanges D D' with the enlarged end F of the spoke E, whereby the spoke is held firmly, so that it cannot be drawn out from the hub, and resists all strains and pressure from that direction. Fourth, by increasing the number of spokes, if desired. In the ordinary hub the mortises cannot be made near together without lessening the strength of the hub. In my improved hub, as the spokes are principally secured outside of the mortises, the number of mortises may be increased and made closer together, as may be desired.

I am aware that bands are sometimes placed on both sides of the spokes and riveted or bolted together through the spokes, but the hole cut to receive the rivet necessarily weakens the spoke. In my improved hub, so far from lessening the amount and strength of the material, they are increased, the spoke-ends being enlarged and secured not by rivets, but by the lateral pressure of the flanges D D'. The wooden hub A, being inclosed by the hub-bands C C', is protected from the weather and cannot swell nor shrink, nor can it be split, as it receives strains and pressure only at right angles. This inside hub may be made of metal, in which case it may be shortened to the dotted lines *a a*, as shown in Fig. 4. A wheel constructed with my improved hub runs true, or in the same vertical plane. The parts of the hub are either turned upon a lathe or cast from patterns so turned; hence the true center is determined and the wheel turns upon it. In the hubs now in use the axle-box is immovably inserted by hand, and only rarely and by accident is it inserted on the true central line throughout the hub; hence the wheel, in turning, continually changes the plane of its revolution, striking now on one side and now upon the other side of the rut of the road, increasing friction and wasting power.

The axle-box B is provided with screw-ends, the threads of which are cut oppositely, as before described. Several important purposes are thereby secured: First, in putting the wheel together the work is quickly and effectually done; a mandrel is inserted in the axle-box B, the several parts of the hub are placed in proper position, with the hub-bands C C' receiving the screw-ends of the axle-box B; by revolving the mandrel in the proper direction both hub-bands are drawn together simultaneously, until they embrace and lock the spokes. The axle-box B being loosely fitted to its receptacle in the hub, all friction is avoided. The opposite direction of the screw-threads affords a double purchase and the spokes are firmly clamped together. Second, in repairing the wheel the mandrel, inserted as before and revolved reversely, causes the hub-bands C C' to separate; the broken spoke is replaced by a new one, and the hub-bands are drawn together as before. If the hub is plated, polished, or ornamented, it is not defaced by the operation of repairing. Third, the screw-threads, being cut in opposite directions, act against each other and prevent play, thus holding the hub-bands firmly in position. Fourth, as is well known, a tire, though properly set, may afterward, on account of the effect of changing weather or temperature upon the wood of the wheel, become too tight or too loose, in either case to the damage of the wheel—the spokes being sprung and the hub strained. My invention obviates this difficulty. The hub-bands are drawn apart, as before, and one (as the case requires) is turned once or twice upon the screw nearer the spoke; then both hub-bands are drawn together, as before. The hub-band first named strikes the spokes before the other does, and, being unresisted, presses the spokes nearer the vertical line, (or vice versa, if the case requires;) then the opposite hub-band comes against the spokes on the other side and holds them in place. A very slight variation at the hub causes a considerable change in the direction of the spokes, thereby affecting the circumference of the wheel. The wheel is thus properly "dished" and sufficient contact with the tire effected. It is obviously within my invention, if the hub-bands C C' are fastened in any manner to the hub A alone, instead of to the axle-box B. The hub above described may be made of any size, from that required for the heaviest cart to that used on the frailest sulky. Its great durability, strength, and comparative cheapness, as well as the facility of repairing it, make it not only a novel but useful invention.

I therefore claim as my invention, and desire to secure by Letters Patent—

The combination of the mortised hub A, the axle-box B with its screw-ends, the hub-bands C C' with their flanges D D', the spokes E E E with their dovetail F, tenon G, and wedge-like faces K K, all constructed and used substantially as described.

SAMUEL C. TILLINGHAST.

Witnesses:
    W. H. BLISS,
    BENJ. M. BOSWORTH, Jr.